(12) United States Patent
Nakajima

(10) Patent No.: US 8,295,823 B2  
(45) Date of Patent: Oct. 23, 2012

(54) MOBILE COMMUNICATION SYSTEM AND AUTOMATIC MODE-CHANGING METHOD

(75) Inventor: Kazuaki Nakajima, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/381,265

(22) PCT Filed: Jun. 14, 2010

(86) PCT No.: PCT/JP2010/003918  
§ 371 (c)(1), (2), (4) Date: Dec. 28, 2011

(87) PCT Pub. No.: WO2011/001615  
PCT Pub. Date: Jan. 6, 2011

(65) Prior Publication Data  
US 2012/0108211 A1 May 3, 2012

(30) Foreign Application Priority Data  
Jun. 29, 2009 (JP) .................................. 2009-154213

(51) Int. Cl.  
*H04M 3/00* (2006.01)

(52) U.S. Cl. .... 455/419; 455/418; 455/411; 340/539.26

(58) Field of Classification Search ............... 455/418, 455/411, 419; 340/539.26  
See application file for complete search history.

(56) References Cited

U.S. PATENT DOCUMENTS

| | | | |
|---|---|---|---|
| 7,606,799 B2 * | 10/2009 | Kalinichenko et al. ........... | 1/1 |
| 2008/0085731 A1 * | 4/2008 | Davidson et al. ............ | 455/517 |
| 2008/0143518 A1 * | 6/2008 | Aaron ............................ | 340/540 |
| 2009/0161884 A1 * | 6/2009 | Render et al. ................... | 381/66 |
| 2009/0192861 A1 * | 7/2009 | Suzuki et al. ..................... | 705/8 |
| 2010/0304757 A1 * | 12/2010 | Yoshioka ................... | 455/456.1 |

FOREIGN PATENT DOCUMENTS

| | | |
|---|---|---|
| JP | 2001-218264 A | 8/2001 |
| JP | 2003-199162 A | 7/2003 |
| JP | 2003-209884 A | 7/2003 |
| JP | 2005-223825 A | 8/2005 |
| JP | 2006-129231 A | 5/2006 |
| JP | 2009-60231 A | 3/2009 |
| WO | WO 2008/126140 A1 | 10/2006 |

* cited by examiner

*Primary Examiner* — Danh Le  
(74) *Attorney, Agent, or Firm* — Sughrue Mion, PLLC

(57) ABSTRACT

A mobile communication system includes: a mobile terminal; plural base stations each of which can conduct communication with the mobile terminal; and a cooperative server that can conduct communication with the base station. The base station detects entrance and exit of the mobile terminal into and from an area covered by the base station and notifies the cooperative server of a detection result. The cooperative server acquires positional information on the mobile terminal from the notification, and stores a residence history of the mobile terminal based on the positional information and a script indicating a rule of a mode setting designated in each mobile terminal in history storing means. The cooperative server activates the script to determine a mode changing command in each mobile terminal based on the residence history and transmits the mode changing command to the base station. The base station transmits the received mode changing command to the mobile terminal that exists in the area covered by the base station. The mobile terminal executes the received mode changing command to change the mode setting.

17 Claims, 9 Drawing Sheets

RULE 1: EXECUTE KEY OPERATION LOCK WHEN MOBILE TERMINAL MOVES TO AREA COVERED BY BASE STATION [Z] AFTER STAYING IN AREA COVERED BY ANY ONE OF [A] TO [Y] BASE STATIONS

EXECUTE KEY OPERATION LOCK

RULE 2: EXECUTE KEY OPERATION LOCK AFTER 10 MINUTES WHEN MOBILE TERMINAL EXITS AREA COVERED BY ANY ONE OF [A] TO [Z] BASE STATIONS

EXECUTE KEY OPERATION LOCK AFTER 10 MINUTES

RULE 3: EXECUTE KEY OPERATION UNLOCK WHEN MOBILE TERMINAL STAYS IN AREA COVERED BY BASE STATION [Z] WHILE NOT STAYING IN ANY AREA COVERED BY [A] TO [Y] BASE STATIONS

EXECUTE KEY OPERATION UNLOCK

RULE 4: EXECUTE KEY OPERATION UNLOCK WHEN MOBILE TERMINAL STAYS IN AT LEAST TWO OF AREAS COVERED BY [A] TO [Y] BASE STATIONS

EXECUTE KEY OPERATION UNLOCK

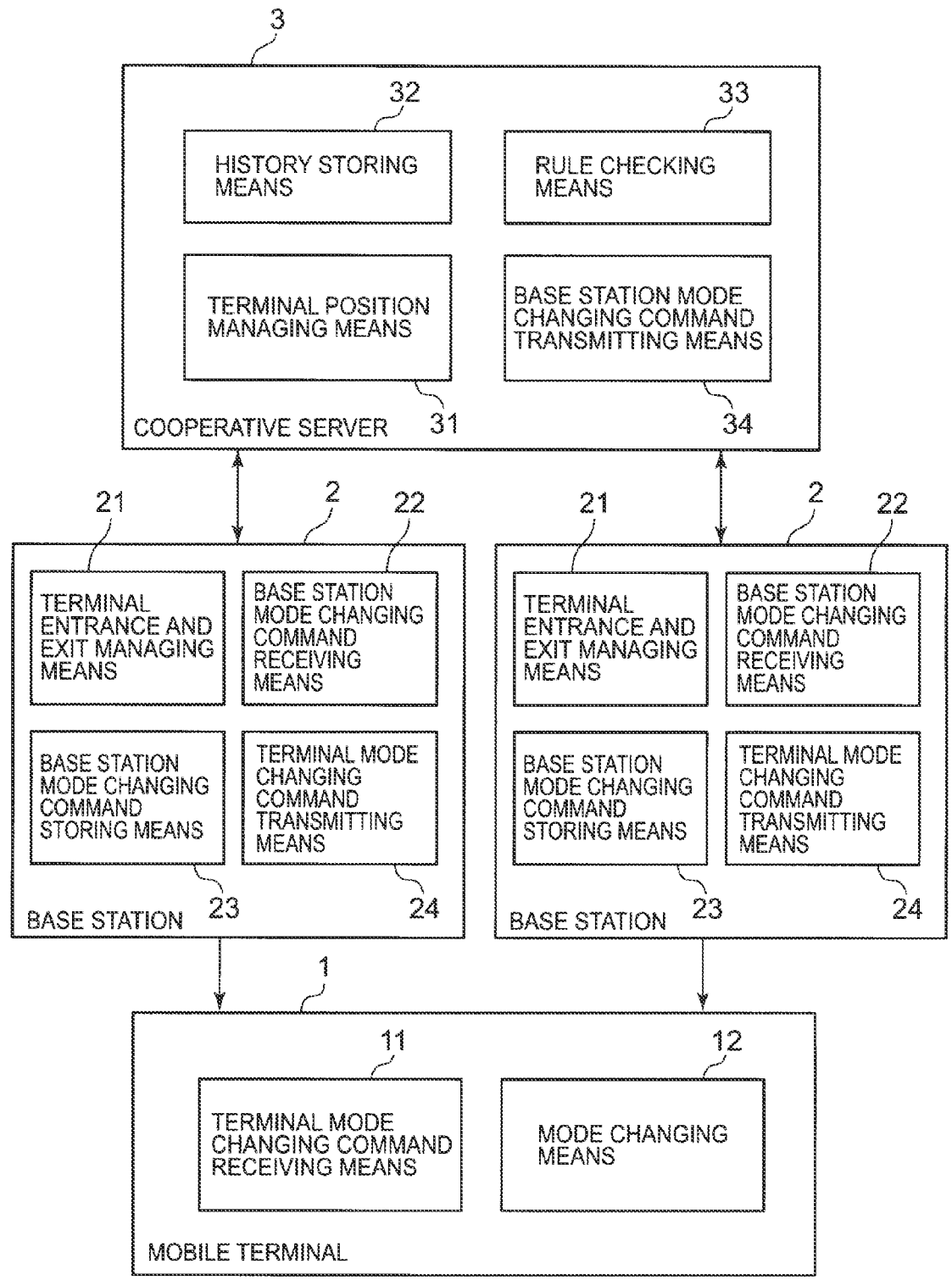

MOBILE COMMUNICATION SYSTEM AND AUTOMATIC MODE-CHANGING METHOD

CROSS REFERENCE TO RELATED APPLICATIONS

This application is a National Stage of International Application No. PCT/JP2010/003918, filed on Jun. 14, 2010, which claims priority from Japanese Patent Application No.2009-154213, filed on Jun. 29, 2009, the contents of all of which are incorporated herein by reference in their entirety.

TECHNICAL FIELD

The present invention relates to a mobile communication system and an automatic mode-changing method, which automatically change a mode of a mobile terminal according to a movement state of the mobile terminal in an area covered by a base station in a mobile communication system that makes a call through the base station.

BACKGROUND ART

Various modes are prepared for a mobile terminal (for example, mobile phone), and a user can set the modes. For example, examples of the modes include key operation lock in which another person cannot operate the mobile terminal, a setting of a silent mode in which a ringtone is turned off, a selection setting of a communication mode whether a wireless LAN is used, an enable or disable setting of data transfer, and a setting of presence. It is necessary that the mode setting be manually performed. Therefore, with increasing kinds of the modes, disadvantageously time and effort of the mode setting are increased, or the mode setting is forgotten.

Patent Literature 1 describes a mobile phone system in which necessity or unnecessity of setting/release of the silent mode can be set according to a behavior pattern of a subscriber or a user. In the mobile phone system described in Patent Literature 1, the setting or release of the silent mode of the mobile phone is performed when movement information based on positional information on the mobile phone, which is provided by a GPS function, is matched with a condition of the setting/release of the silent mode, which is previously registered by the subscriber or the user.

Patent Literature 2 describes a mobile phone system in which base station identification information is utilized as the positional information. In the mobile phone system described in Patent Literature 2, even if the GPS function is not mounted on the mobile phone, the mobile phone can perform an operation (for example, alarm notification) that is set to the mobile phone while correlated with a base station based on the base station identification information received from the base station.

CITATION LIST
Patent Literature
PLT 1: Japanese Patent Application Laid-Open No. 2003-209884 (Paragraph No. 0020)
PLT 2: Japanese Patent Application Laid-Open No. 2005-223825 (Paragraph Nos. 0008, 0030, and 0031)

SUMMARY OF INVENTION

Technical Problem

However, in the mobile phone system described in Patent Literature 1, because the subscriber or the user registers the condition of the setting/release of the mode in the mobile phone, a manager of the mobile terminal system cannot register the condition of the setting/release of the mode. Because the movement information is required, the movement information cannot be acquired based on the positional information in the mobile phone without including the GPS function.

In the mobile phone system described in Patent Literature 2, a predetermined operation such as the alarm notification can be performed by detecting whether the mobile phone enters or exits a specific base station range (in area: in zone). However, the mobile phone does not perform the predetermined operation based on the setting condition including a sequence in which the mobile phone passes through the ranges covered by the plural base stations. For example, in the case in which the alarm notification is performed when the mobile phone enters an area A, different operations cannot be set for the case in which the mobile phone enters the area A from an area B, and the case in which the mobile phone enters the area A from an area C.

An object of the invention is to provide a mobile communication system and an automatic mode-changing method, in which the plural base stations cooperate to change the mode setting of the mobile terminal in tandem with the entrance and exit of the mobile terminal into and from the area covered by the base station.

Solution to Problem

In accordance with an aspect of the invention, a mobile communication system includes: a mobile terminal; plural base stations each of which can conduct communication with the mobile terminal; and a cooperative server that can conduct communication with the base station, wherein the cooperative server includes: terminal position managing means for acquiring positional information on the mobile terminal from a detection result of the mobile terminal that enters and exits an area covered by the base station; history storing means for storing a residence history of the mobile terminal based on the positional information on the mobile terminal, which is acquired by the terminal position managing means, and a script indicating a rule of a mode setting designated in each mobile terminal; rule checking means for activating the script to determine a mode changing command in each mobile terminal based on the residence history stored in the history storing means; and base station mode changing command transmitting means for transmitting the mode changing command determined by the rule checking means to the base station, the base station includes: terminal entrance and exit managing means for detecting the entrance and exit of the mobile terminal into and from the area covered by the base station to notify the cooperative server of a detection result; base station mode changing command receiving means for receiving the mode changing command from the base station mode changing command transmitting means of the cooperative server; base station mode changing command storing means for storing the mode changing command received by the base station mode changing command receiving means therein; and terminal mode changing command transmitting means for transmitting the mode changing command stored in the base station mode changing command storing means to the mobile terminal that exists in the area covered by the base station, and the mobile terminal includes: terminal mode changing command receiving means for receiving the mode changing command from the terminal mode changing command transmitting means of the base station; and mode changing means for changing a mode setting of the mobile terminal by executing the mode changing command that is received by the terminal mode changing command receiving means.

In accordance with another aspect of the invention, an automatic mode-changing method for changing a mode setting of a mobile terminal in a mobile communication system that includes the mobile terminal, plural base stations each of which can conduct communication with a mobile terminal, and a cooperative server that can conduct communication with the base station, wherein the base station detects the mobile terminal, which enters and exits an area covered by the base station, to notify the cooperative server of a detection result; the cooperative server acquires positional information on the mobile terminal from the detection result of which the base station notifies the cooperative server; the cooperative server stores a residence history of the mobile terminal based on the acquired positional information on the mobile terminal and a script indicating a rule of a mode setting designated in each mobile terminal in history storing means; the cooperative server activates the script to determine a mode changing command in each mobile terminal based on the residence history stored in the history storing means; the cooperative server transmits the determined mode changing command to the base station; the base station receives the mode changing command from the cooperative server to store the mode changing command in base station mode changing command storing means; the base station transmits the mode changing command stored in the base station mode changing command storing means to the mobile terminal that exists in the area covered by the base station; the mobile terminal receives the mode changing command from the base station; and the mobile terminal executes the received mode changing command to change a mode setting of the mobile terminal.

Advantageous Effects of Invention

According to the invention, the cooperative server generates the mode changing command based on the residence history of the mobile terminal, which is acquired from the plural base stations, and the rule designated in each mobile terminal, and the mode changing command is transmitted to the mobile terminal through the base station and executed. Therefore, the mode setting of the mobile terminal can automatically be changed in association with the entrance and exit of the mobile terminal into and from the area covered by the base station and according to the rule in which the plural base stations cooperate with one another.

BRIEF DESCRIPTION OF DRAWINGS

[FIG. 11] It depicts a block diagram illustrating a main configuration of a mobile communication system according to the invention.

DESCRIPTION OF EMBODIMENTS

Figure 1:
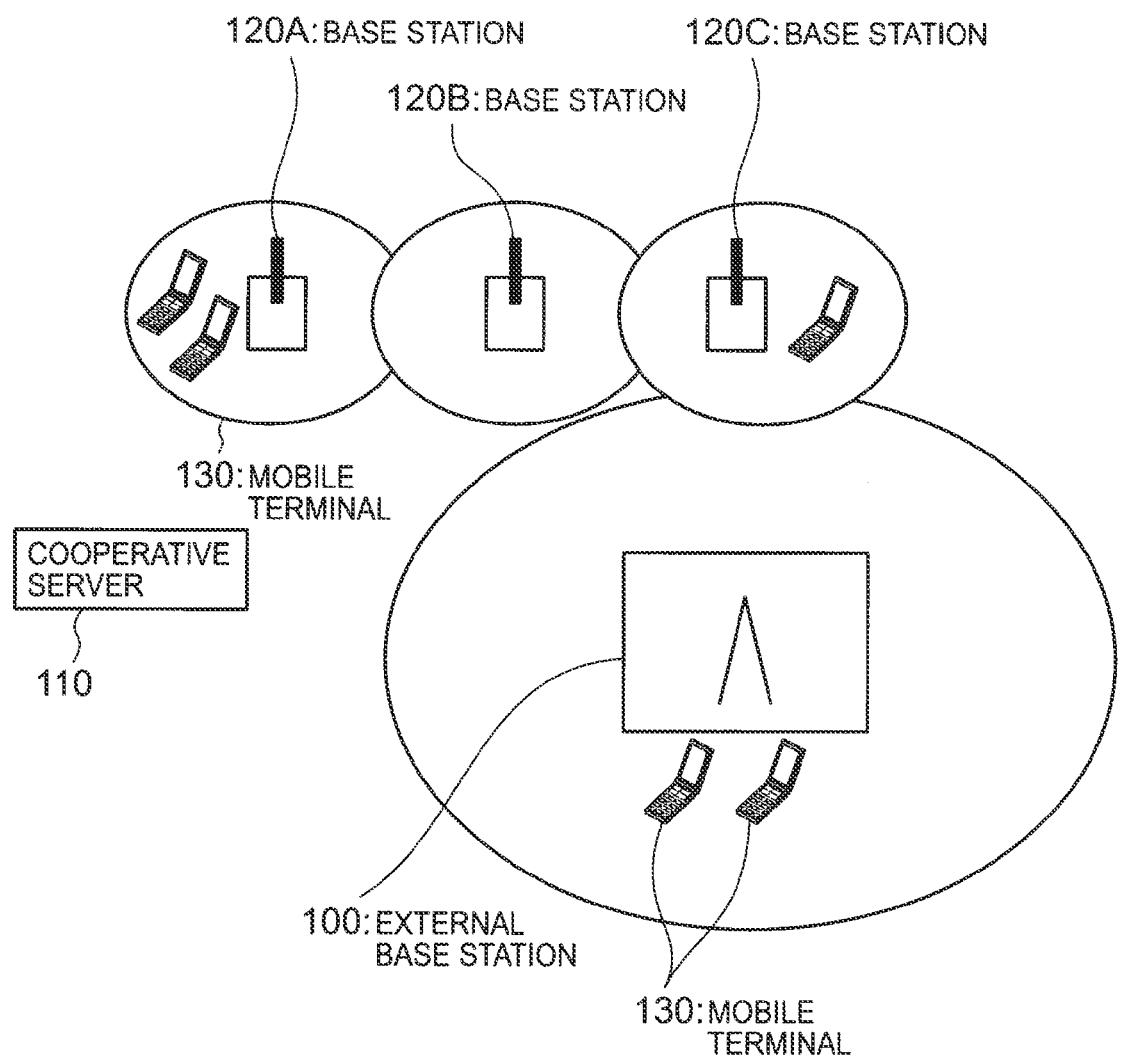
[FIG. 1] It depicts a block diagram illustrating a configuration of a mobile communication system according to an exemplary embodiment of the invention.

FIG. 1 is a block diagram illustrating a configuration of a mobile communication system according to an exemplary embodiment of the invention. The configuration of the mobile communication system according to the exemplary embodiment of the invention will schematically be described with reference to FIG. 1.

The mobile communication system illustrated in FIG. 1 includes a cooperative server 110, plural base stations 120A, 120B, and 120C, and plural mobile terminals 130. The cooperative server 110 does not manage an external base station 100.

The base stations 120A, 120B, and 120C are placed under the charge of the cooperative server 110, and the cooperative server 110 conducts communication. Although the three base stations 120A, 120B, and 120C are illustrated in FIG. 1, at least four base stations may be placed under the charge of the cooperative server 110. Each of the base stations 120A, 120B, and 120C is a small-scale base station such as a femtocell or wireless LAN base station that is placed under the charge of the cooperative server 110. The external base station 100 is a macrocell external base station and a small-scale base station that is placed out of the charge of the cooperative server 110. The cooperative server 110 has no concern with the external base station 100. In FIG. 1, a circle centered on each base station expresses a range (area) where each base station can conduct communication with the mobile terminal 130. It is assumed that the mobile terminal 130 can conduct communication with the base station when existing in the area (a zone where the base station can conduct communication with the mobile terminal) covered by a certain base station.

The cooperative server 110 conducts communication with the base stations 120A, 120B, and 120C that are placed under the charge of the cooperative server 110, and the cooperative server 110 acquires information (entrance and exit information) indicating that the mobile terminal 130 enters and exits the areas covered by the base stations 120A, 120B, and 120C. The cooperative server 110 generates a mode changing command and distributes the mode changing commands for every mobile terminals to the base stations 120A, 120B, and 120C. When the mobile terminal 130 exists in the areas covered by the base stations 120A, 120B or 120C, the mobile terminal 130 receives the mode changing command from the base station having the area in which the mobile terminal 130 exists. In response to the received mode changing command, the mobile terminal 130 performs a mode change of the mobile terminal 130 in designated timing.

Figure 2:
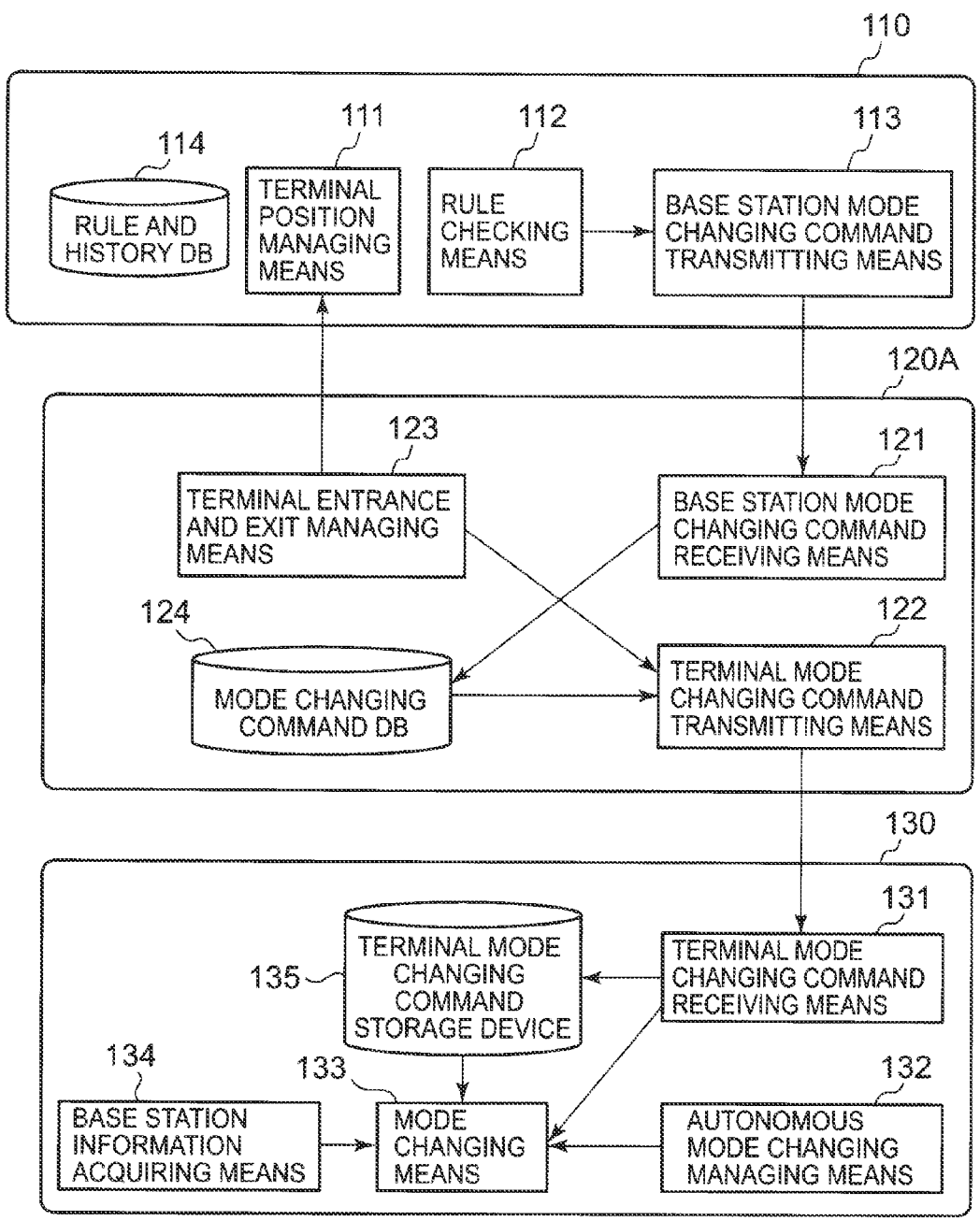
[FIG. 2] It depicts a block diagram illustrating a detailed configuration of the mobile communication system of FIG. 1.
Figure 3:
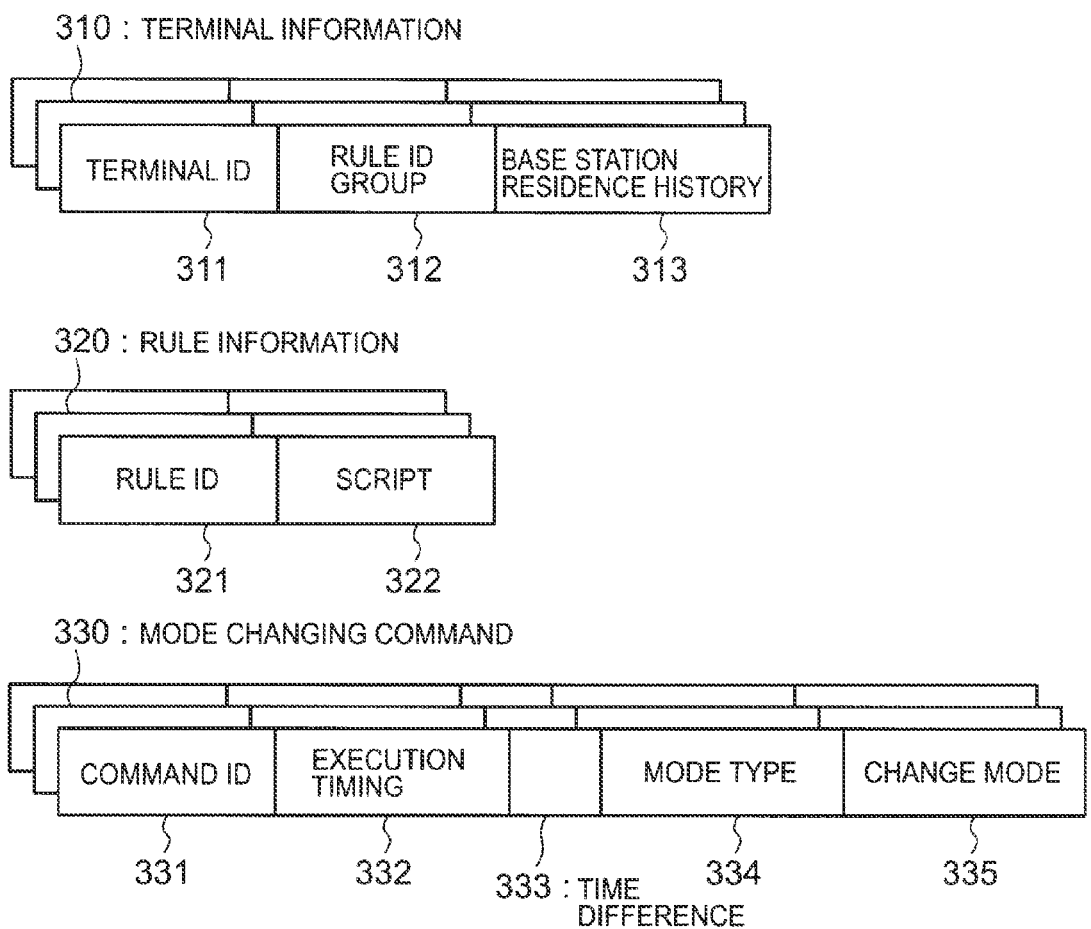
[FIG. 3] It depicts an explanatory view illustrating an example of a data structure stored in a rule and history DB illustrated in FIG. 2.
Figure 4:
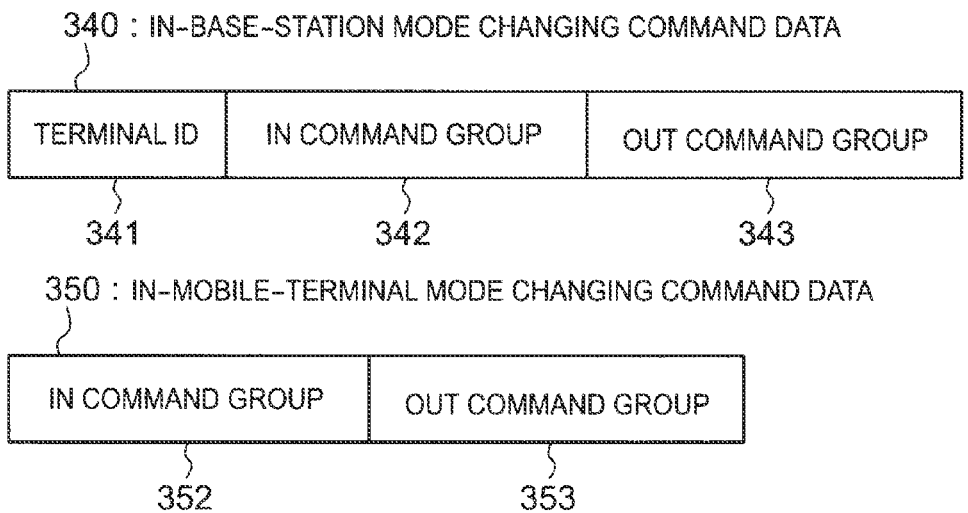
[FIG. 4] It depicts an explanatory view illustrating an example of a data structure used in the mobile communication system of FIG. 2.

FIG. 2 is a block diagram illustrating a detailed configuration of the mobile communication system of FIG. 1. FIG. 3 is an explanatory view illustrating an example of a data structure stored in a rule and history DB illustrated in FIG. 2. FIG. 4 is an explanatory view illustrating an example of a data structure used in the mobile communication system of FIG. 2. The detailed configuration of the mobile communication system of FIG. 1 will be described with reference to FIGS. 2 to 4.

In the mobile communication system, although the base station 120A is illustrated in FIG. 2, the configurations of the base stations 120B and 120C that are placed under the charge of the cooperative server 110 are identical to that of the base station 120A.

The cooperative server 110 includes terminal position managing means 111, rule checking means 112, base station mode changing command transmitting means 113, and a rule and history DB 114. For example, each means included in the cooperative server 110 is implemented by a CPU that performs control according to a program.

The terminal position managing means 111 receives the entrance and exit information on the mobile terminal 130 in the area covered by each base station from terminal entrance and exit managing means 123 of the base stations 120A, 120B, and 120C. The terminal position managing means 111 stores a residence history, which indicates a history of the area covered by the base station in which the mobile terminal 130 stays, in the rule and history DB 114 based on the entrance and exit information received from each of the base stations 120A, 120B, and 120C. The residence history of each mobile terminal is stored in a base station residence history 313 of terminal information 310 of the rule and history DB 114. The base station residence history 313 corresponding to the mobile terminal 130 is updated when the terminal position managing means 111 stores the residence history of the mobile terminal 130.

The rule checking means 112 activates a rule to generate in-base-station mode changing command data 340 including a mode changing command 330 based on the residence history of the mobile terminal 130. The base station mode changing command transmitting means 113 transmits the generated in-base-station mode changing command data 340 to base station mode changing command receiving means 121 of the base station 120A.

The terminal information 310 illustrated in FIG. 3 includes a terminal ID 311, a rule ID group 312, and the base station residence history 313. The terminal information 310 indicates a rule that is set in each mobile terminal and a residence history. The terminal ID 311 is set in each mobile terminal. All rule IDs 321 that can identify the rule set to the mobile terminal identified by the terminal ID 311 are stored in the rule ID group 312. A script of the rule corresponding to the rule ID 321 can be identified by referring to rule information 320.

The base station residence history 313 indicates when the mobile terminal 130 exists in an area covered by which base station. For example, it is assumed that a certain mobile terminal 130 moves in the areas covered by each base station in order of the base station 120A, the base station 120B, and the base station 120C. Assuming that IN expresses that the mobile terminal 130 enters the area covered by the base station while OUT expresses that the mobile terminal 130 exits the area covered by the base station, a history of "base station 120A IN [right arrow] base station 120A OUT [right arrow] base station 120B IN [right arrow] base station 120B OUT [right arrow] base station 120C IN" is retained in the base station residence history 313 of the terminal information 310 of the mobile terminal 130. In order to prevent an overflow of the data stored in the rule and history DB 114, a maximum value of the number of histories may be set, and the old history may be deleted when the number of histories exceeds the maximum value.

The rule checking means 112 is activated when the terminal position managing means 111 updates the base station residence history 313. The rule checking means 112 checks the rule by referring to the terminal information 310 to which the updated base station residence history 313 belongs. In the checking of the rule, the rule checking means 112 ensures at least one rule ID 321 stored in the rule ID group 312 of the referred-to terminal information 310, and refers to the rule information 320 to which each rule ID 321 belongs. The rule checking means 112 activates a script 322 of the referred-to rule information 320 to execute the rule.

The rule information 320 includes the rule ID 321 and the script 322 corresponding to the rule ID 321. The rule that a predetermined command is executed under a predetermined condition is stored in the rule information 320. The rule ID 321 is set in each rule. Specific contents of the rule are described in the script 322. The script 322 includes a conditional expression and an execution command.

A description example of the script 322 will be described. For example, the script 322 is expressed by a script language, such as "if (base station 120A IN) then {transmit command X}" and "if (base station 120B OUT) then {transmit command Y}", which describes a general conditional expression. At this point, the conditional expression of "base station 120A IN" indicates that (the mobile terminal 130) enters the area covered by the base station 120A, and the conditional expression of "base station 120B OUT" indicates that (the mobile terminal 130) exits the area covered by the base station 120B. "Transmit command X" and "transmit command Y" are the execution command added to each conditional expression.

As to a description example of the script 322 that the plural base stations cooperate with each other, for example, the script 322 is described as "if ((base station 120A IN) or (base station 120B IN)) then {transmit command Z}" in the case of any base station, and the script 322 is described as "if (1) then {transmit command Z}" in the case of all the base stations.

When a sequence in which the mobile terminal 130 passes through the areas covered by the base stations is considered as the condition, for example, "if (((base station 120A IN) or (base station 120A OUT))<(base station 120B IN)) then {transmit command Z}" is described. The description indicates that the command Z is transmitted when the mobile terminal 130 enters the area covered by the base station 120B after the mobile terminal 130 enters or exits the area covered by the base station 120A. When the base station existing out of the areas covered by the base stations 120A and 120B may enter some areas while moving from the base station 120A to the base station 120B, for example, when the base station may enter three states, "if (base station 120A IN)|(base station 120A OUT)<3<(base station 120B IN)) then {transmit command Z}" is described.

When the plural mode changing commands are transmitted, for example, "if (base station 120A IN) then {transmit command X; transmit command Y; transmit command Z}" is described. The description indicates that the commands X, Y, and Z are transmitted when the mobile terminal 130 enters the area covered by the base station 120A. The transmitted commands X, Y, and Z are designated by a command ID 331 that is set in each command. The command ID 331 is described in the mode changing command 330 stored in the rule and history DB 114.

Using an OUT command (the OUT command is described later), the rule checking means 112 causes all the base stations 120A, 120B, and 120C to execute the rule to all the mobile terminals 130 only a first time after a system manager registers or updates the rule. Therefore, the base station mode changing command transmitting means 113 of the cooperative server 110 distributes the default mode changing command 330 to all the base stations 120A, 120B, and 120C. The operation can change a mode of the mobile terminal 130 from each base station before an inquiry is made at the cooperative server 110, when the mobile terminal 130 enters the area covered by the base station 120A, 120B, or 120C that is placed under the charge of the cooperative server 110.

The rule checking means 112 generates the plural mode changing commands 330 based on the plural rule information 320 that can be referred to from the rule ID 321 stored in the rule ID group 312 of the terminal information 310.

The mode changing command 330 includes pieces of data indicating the command ID 331, execution timing 332, a time difference 333, a mode type 334, and a change mode 335. The command ID 331 is set in each mode changing command.

The execution timing 332 indicates timing in which the belonged-to mode changing command 330 is executed. Specifically, for example, the execution timing 332 is stored as an "IN command" when the execution timing 332 is a command that is activated when the mobile terminal 130 enters the area covered by a certain base station, and the execution timing 332 is stored as the "OUT command" when the execution timing 332 is a command that is activated in the case that the mobile terminal 130 exits the area covered by a certain base station.

The time difference 333 indicates a predetermined time when the mode changing command 330 is executed after a predetermined time elapses since the mobile terminal 130 enters or exits the area covered by the predetermined base station. A time in which the mobile terminal 130 enters the area covered by the predetermined base station is set to a reference when the execution timing 332 is the "IN command", and a time in which the mobile terminal 130 exits the area covered by the predetermined base station is set to a reference when the execution timing 332 is the "OUT command". For example, when the execution timing 332 is the "IN command" while the time difference 333 is "0 second", the mode changing command 330 is executed at the same time as the mobile terminal 130 enters the area covered by the predetermined base station. For example, when the execution timing 332 is the "OUT command" while the time difference 333 is "3 seconds", the mode changing command 330 is executed 3 seconds after the mobile terminal 130 exits the area covered by the predetermined base station.

The mode type 334 indicates a type of the mode that is executed by the mode changing command 330. For example, predetermined codes corresponding to a silent mode, key operation lock, a wireless LAN mode, and the like are described in the mode type 334. The mode that is set after a mode change is described in the change mode 335 according to the mode type 334 of the belonged-to mode changing command 330. For example, one of ON and OFF is described in the change mode 335 when the silent mode or the key operation lock is indicated in the mode type 334. Public only, wireless LAN only, public preference, or wireless LAN preference is described in the change mode 335 when the wireless LAN mode is indicated in the mode type 334. In the mode changing command 330, the different mode type 334 may be described in each command ID 331.

Figure 8:
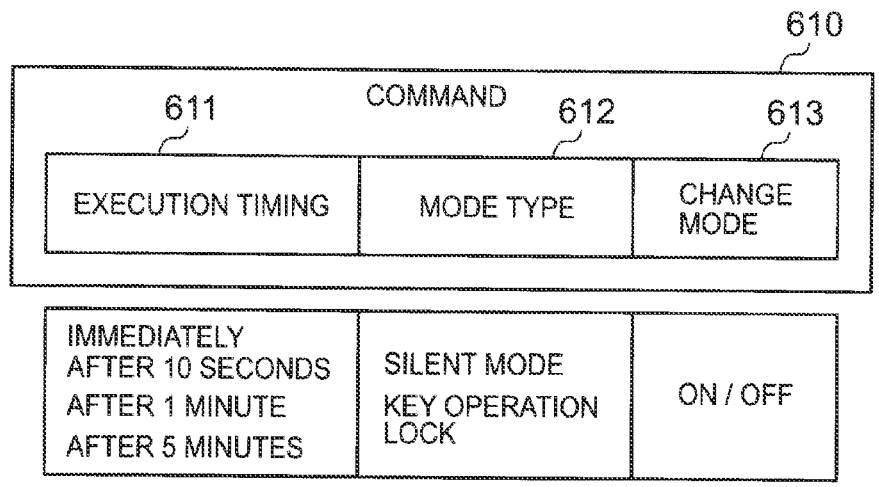
[FIG. 8] It depicts an explanatory view illustrating an example of a specific description of a mode changing command.

FIG. 8 is an explanatory view illustrating an example of the specific description of the mode changing command. A command 610 is an example of the specifically-described mode changing command 330. The command 610 includes execution timing 611, a mode type 612, and a change mode 613.

For example, "immediate" execution, execution "after 10 seconds", execution "after 1 minute", and execution "after 5 minutes" can be described in the execution timing 611. In the mode type 612, not only the modes such as the silent mode and the key operation lock which are normally included in the mobile phone can be designated, but also particular modes such as the wireless LAN mode and a power mode can be designated. The change mode 613 indicates which state (for example, ON or OFF) is set to the mode designated by the mode type 612.

The rule checking means 112 generates the mode changing command 330, which is determined from the command of the script 322, with respect to the base station described by the conditional expression of the script 322 of the rule information 320. As a result, because the plural mode changing commands 330 are generated with respect to the base stations, the rule checking means 112 generates the in-base-station mode changing command data 340 by organizing contents of the plural mode changing commands 330 in each base station. The checking of the rule is completed by the generation of the in-base-station mode changing command data 340.

The in-base-station mode changing command data 340 indicates which mode changing command or rule is executed in each mobile terminal in a certain base station. The in-base-station mode changing command data 340 includes a terminal ID 341, an IN command group 342, and an OUT command group 343. The terminal ID 341 corresponds to the terminal ID 311 of the terminal information 310. In order that the IN command and the OUT command can separately be managed, the mode changing commands 330 are stored in the IN command group 341 and the OUT command group 342 while divided into the IN command and the OUT command according to the description of the execution timing 332 of the mode changing command 330. The reason the IN command and the OUT command can separately be managed is that the IN command differs from the OUT command in operation timing. Particularly, it is necessary that the OUT command be operated when the mobile terminal 130 exits the area covered by the predetermined base station. Therefore, it is necessary to accumulate contents of the OUT command in the mobile terminal 130.

In each mobile terminal in which the checking of the rule is completed or in each base station, the base station mode changing command transmitting means 113 transmits the in-base-station mode changing command data 340 generated by the rule checking means 112 to the base station mode changing command receiving means 121 of the base station 120A. At this point, the in-base-station mode changing command data 340 is transmitted to not only the base station 120A of which the mobile terminal 130 enters the area but also all the base stations 120A referred to by the script 332.

The terminal information 310, the rule information 320, and the mode changing command 330, which are illustrated in FIG. 3, are stored in the rule and history DB 114. The terminal information 310, the rule information 320, and the mode changing command 330 may previously be input as a database from the system manager and the like. The terminal information 310, the rule information 320, and the mode changing command 330 are not input by each base station (for example, base stations 120A, 120B, and 120C), but collectively input by the cooperative server 110, thereby facilitating maintenance.

The base station 120A includes base station mode changing command receiving means 121, terminal mode changing command transmitting means 122, terminal entrance and exit managing means 123, and a mode changing command DB 124. For example, each means included in the base station 120A is implemented by the CPU that performs control according to the program.

The base station mode changing command receiving means 121 receives the in-base-station mode changing command data 340 from the base station mode changing command transmitting means 113 of the cooperative server 110. The base station mode changing command receiving means 121 stores the received in-base-station mode changing command data 340 in the mode changing command DB 124. When the mobile terminal 130 described in the received in-base-station mode changing command data 340 does not enters the area covered by the base station 120A, the base station mode changing command receiving means 121 waits for the mobile terminal 130 to enter the area covered by the base station 120A. When the mobile terminal 130 enters the area covered by the base station 120A, or when the mobile terminal 130 already enters the area covered by the base station 120A, the base station mode changing command receiving means 121 transfers the control to the terminal mode changing command transmitting means 122.

The terminal mode changing command transmitting means 122 transmits in-mobile-terminal mode changing command data 350 in which the mode changing command 330 is stored to the terminal mode changing command receiving means 131 of the mobile terminal 130. The terminal mode changing command transmitting means 122 is activated when the operation performed by the base station mode changing command receiving means 121 is ended to transfer the control to the terminal mode changing command transmitting means 122. The terminal mode changing command transmitting means 122 is also activated when the terminal entrance and exit managing means 123 detects that the mobile terminal 130 enters the area covered by the base station 120A while the in-base-station mode changing command data 340 about the mobile terminal 130 is stored in the mode changing command DB 124.

The activated terminal mode changing command transmitting means 122 refers to the plural pieces of in-base-station mode changing command data 340 stored in the mode changing command DB 124, copies the IN command group 342 about the terminal ID 341 indicating a certain mobile terminal 130 to an IN command group 352, and copies the OUT command group 343 to an OUT command group 353, thereby generating the in-mobile-terminal mode changing command data 350. The terminal mode changing command transmitting means 122 transmits the generated in-mobile-terminal mode changing command data 350 to the terminal mode changing command receiving means 131 of the mobile terminal 130.

The terminal entrance and exit managing means 123 notifies the terminal position managing means 111 in the cooperative server 110 of the entrance and exit information when the mobile terminal 130 enters the area covered by the base station 120A or when the mobile terminal 130 exits the area covered by the base station 120A. The terminal entrance and exit managing means 123 makes a request for the terminal mode changing command transmitting means 122 to transmit the in-mobile-terminal mode changing command data 350, when the mobile terminal 130 enters the area covered by the base station 120A while the in-base-station mode changing command data 340 corresponding to the mobile terminal 130 is stored in the mode changing command DB 124.

The in-base-station mode changing command data 340 is stored in the mode changing command DB 124. The in-base-station mode changing command data 340 is transferred from the base station mode changing command receiving means 121 and stored. The terminal mode changing command transmitting means 122 generates the in-mobile-terminal mode changing command data 350 from the in-base-station mode changing command data 340 stored in the mode changing command DB 124.

The mobile terminal 130 includes the terminal mode changing command receiving means 131, autonomous mode changing managing means 132, mode changing means 133, base station information acquiring means 134, and a terminal mode changing command storage device 135. Each means included in the mobile terminal 130 is implemented by the CPU that performs the control according to the program.

The terminal mode changing command receiving means 131 stores the in-mobile-terminal mode changing command data 350 received from the terminal mode changing command transmitting means 122 of the base station 120A in the terminal mode changing command storage device 135. At this point, the terminal mode changing command receiving means 131 stores the in-mobile-terminal mode changing command data 350 in the terminal mode changing command storage device 135 in each IN command group 352 or each OUT command group 353. At this point, the mode changing means 133 is activated when the stored in-mobile-terminal mode changing command data 350 is the IN command group.

When the mode type 334 of the mode changing command 330 included in the stored in-mobile-terminal mode changing command data 350 is identical to the mode type 334 of the mode changing command 330 that is already stored in the terminal mode changing command storage device 135, the terminal mode changing command receiving means 131 overwrites and stores the in-mobile-terminal mode changing command data 350 and cancels the mode changing command 330 that are already stored.

When a user performs a predetermined operation through a display unit (not illustrated) or an operation unit (not illustrated) of the mobile terminal 130, the autonomous mode changing managing means 132 provides an instruction of the mode change in response to operation contents of the user. When the user performs the predetermined operation, the autonomous mode changing managing means 132 activates the mode changing means 133.

The mode changing means 133 is activated when the in-mobile-terminal mode changing command data 350, which is received by the terminal mode changing command receiving means 131 and stored in the terminal mode changing command storage device 135, is the IN command group. At this point, the mode changing means 133 extracts the IN command group of the in-mobile-terminal mode changing command data 350 stored in the terminal mode changing command storage device 135, and extracts the corresponding mode changing command 330. The mode changing means 133 performs the mode change according to the time difference 333, the mode type 334, and the change mode 335 of the extracted mode changing command 330 when the mobile terminal 130 enters the area covered by the base station 120A. When the time difference 333 is not 0, the mode change is performed after the designated time elapses.

The mode changing means 133 is also activated by a command of the base station information acquiring means 134. At this point, the mode changing means 133 extracts the OUT command group of the in-mobile-terminal mode changing command data 350 stored in the terminal mode changing command storage device 135, and extracts the corresponding mode changing command 330. The mode changing means 133 performs the mode change according to the extracted mode changing command 330 when the mobile terminal 130 exits the area covered by the base station 120A.

There is a possibility that the mobile terminal 130 enters the area covered by another base station (for example, base station 120B) when the mobile terminal 130 exits the area covered by the base station 120A. At this point, the time difference of the OUT command of the base station 120A is set to a value except 0. Therefore, when the base station 120B transmits the IN command to instruct the same mode change to the mobile terminal 130, the OUT command is overwritten on the IN command from the base station 120B. As a result, it is not necessary for the mode changing means 133 to perform the same mode change plural times.

When activated by the autonomous mode changing managing means 132, the mode changing means 133 performs the mode change of the mobile terminal 130 in response to the instruction from the autonomous mode changing managing means 132.

The base station information acquiring means 134 detects that the mobile terminal 130 exits the area covered by the base station 120A or that the base station 120A that conducts communication with the mobile terminal 130 is changed. When detecting that the mobile terminal 130 exits the area covered by the base station 120A or that the base station 120A that conducts communication with the mobile terminal 130 is changed, the base station information acquiring means 134 provides an instruction to execute the OUT command of the in-mobile-terminal mode changing command data 350 to the mode changing means 133, and transfers the control to the mode changing means 133.

Figure 5:
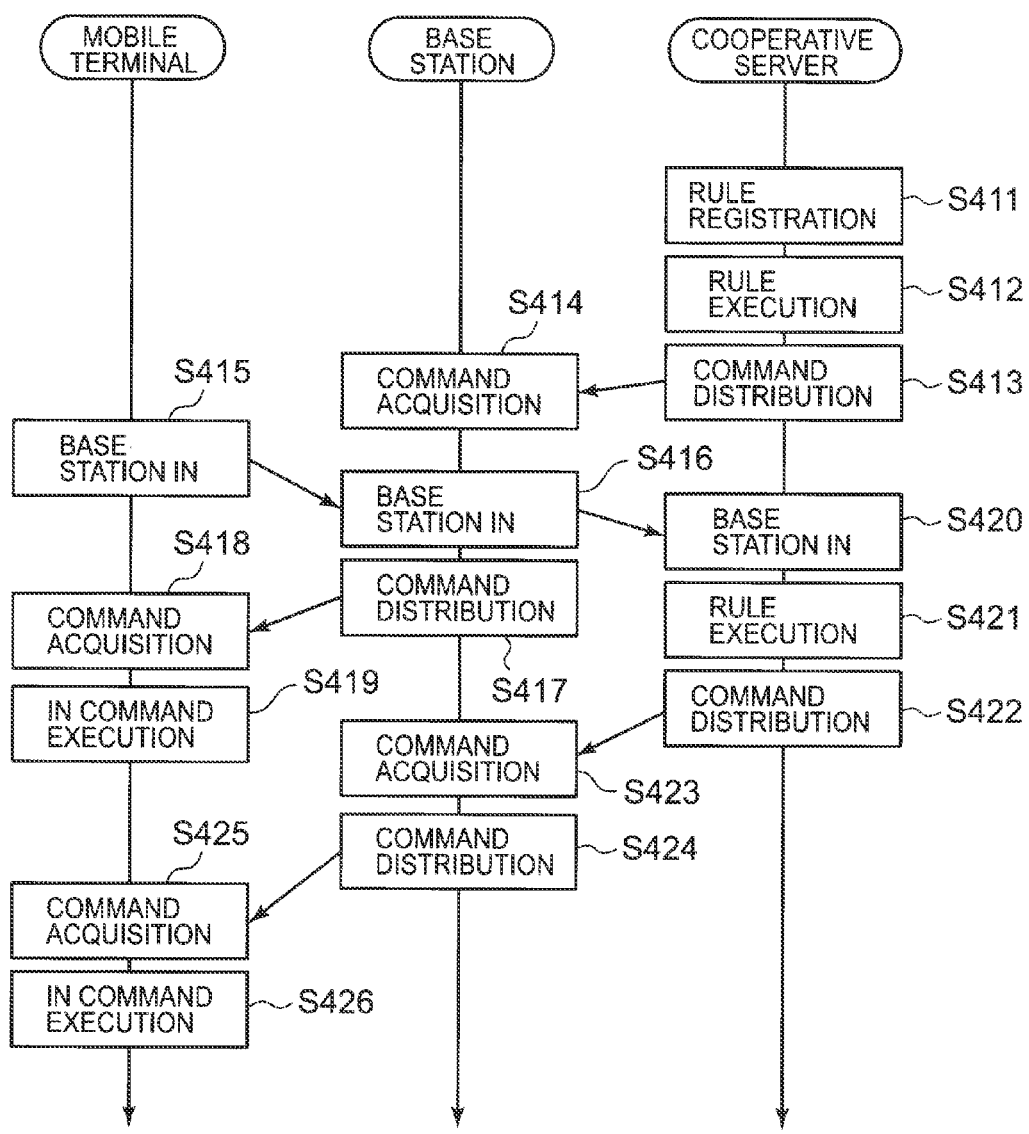
[FIG. 5] It depicts a sequence diagram illustrating operations of a cooperative server, a base station, and a mobile terminal when an IN command is executed.

FIG. 5 is a sequence diagram illustrating operations of the cooperative server, the base station, and the mobile terminal when the IN command is executed. An operation in the case that the IN command relating to the base station 120A is executed will be described with reference to FIG. 5.

The system manager registers the rule using the cooperative server 110 (Step S411). Specifically, the terminal information 310, the rule information 320, and the mode changing command 330 are input to the rule and history DB 114.

Using the OUT command, the rule checking means 112 causes all the base stations 120A, 120B, and 120C to execute the rule to all the mobile terminals 130 as only the first time after the system manager registers or updates the rule (Step S412). Therefore, the base station mode changing command transmitting means 113 distributes the default mode changing command 330 to all the base stations 120A, 120B, and 120C (Step S413). When receiving the default mode changing command 330, the base station mode changing command receiving means 121 of the base station 120A stores the default mode changing command 330 in the mode changing command DB 124 (Step S414).

When the mobile terminal 130 enters the area covered by the base station 120A (Step S415), the terminal entrance and exit managing means 123 of the base station 120A detects that the mobile terminal 130 enters the area covered by the base station 120A (Step S416). The terminal entrance and exit managing means 123 notifies the terminal position managing means 111 in the cooperative server 110 of the detection result. The terminal position managing means 111 stores the residence history of the mobile terminal 130 in the rule and history DB 114 and update the base station residence history 313 of the terminal information 310. That the mobile terminal 130 enters the area covered by the base station 120A is registered in the cooperative server 110 through the operation (Step S420).

In Step S416, when the terminal entrance and exit managing means 123 of the base station 120A detects that the mobile terminal 130 enters the area covered by the base station 120A, the terminal mode changing command transmitting means 122 is activated with the detection as a trigger. The terminal mode changing command transmitting means 122 transmits the in-mobile-terminal mode changing command data 350 to the terminal mode changing command receiving means 131 of the mobile terminal 130 (Step S417).

When the terminal mode changing command receiving means 131 of the mobile terminal 130 receives the in-mobile-terminal mode changing command data 350 (Step S418), the mode changing means 133 executes the IN command to perform the mode change in association with the entrance of the mobile terminal 130 into the area covered by the base station 120A (Step S419).

On the other hand, in Step S420, when the terminal position managing means 111 of the cooperative server 110 updates the base station residence history 313 of the rule and history DB 114, the rule checking means 112 is activated to check the rule. In the checking of the rule, the rule checking means 112 activates the script 322 of the rule information 320 to execute the rule (Step S421).

In Step S421, as a result of the execution of the rule, the mode changing commands 330 are collected to generate the in-base-station mode changing command data 340. The base station mode changing command transmitting means 213 transmits the generated in-base-station mode changing command data 340 to the base station mode changing command receiving means 121 of the base station 120A (Step S422).

The base station mode changing command receiving means 121 of the base station 120A receives the in-base-station mode changing command data 340 (Step S423). When the mobile terminal 130 exists in the area covered by the base station 130A, the terminal mode changing command transmitting means 122 transmits the in-mobile-terminal mode changing command data 350, in which the mode changing command 330 included in the in-base-station mode changing command data 340 is stored, to the terminal mode changing command receiving means 131 of the mobile terminal 130 (Step S424).

When the terminal mode changing command receiving means 131 of the mobile terminal 130 receives the in-mobile-terminal mode changing command data 350 (Step S425), the mode changing means 133 executes the IN command to perform the mode change again in association with the entrance of the mobile terminal 130 into the area covered by the base station 120A (Step S426). When the IN command is the same command as the command acquired in Step S418 in performing the mode change again, the same mode change is performed. When the IN command differs from the command acquired in Step S418 in performing the mode change again, the IN command is overwritten by the IN command in Step S426. As a result, the latest mode changing command is executed in the mobile terminal 130.

Figure 6:
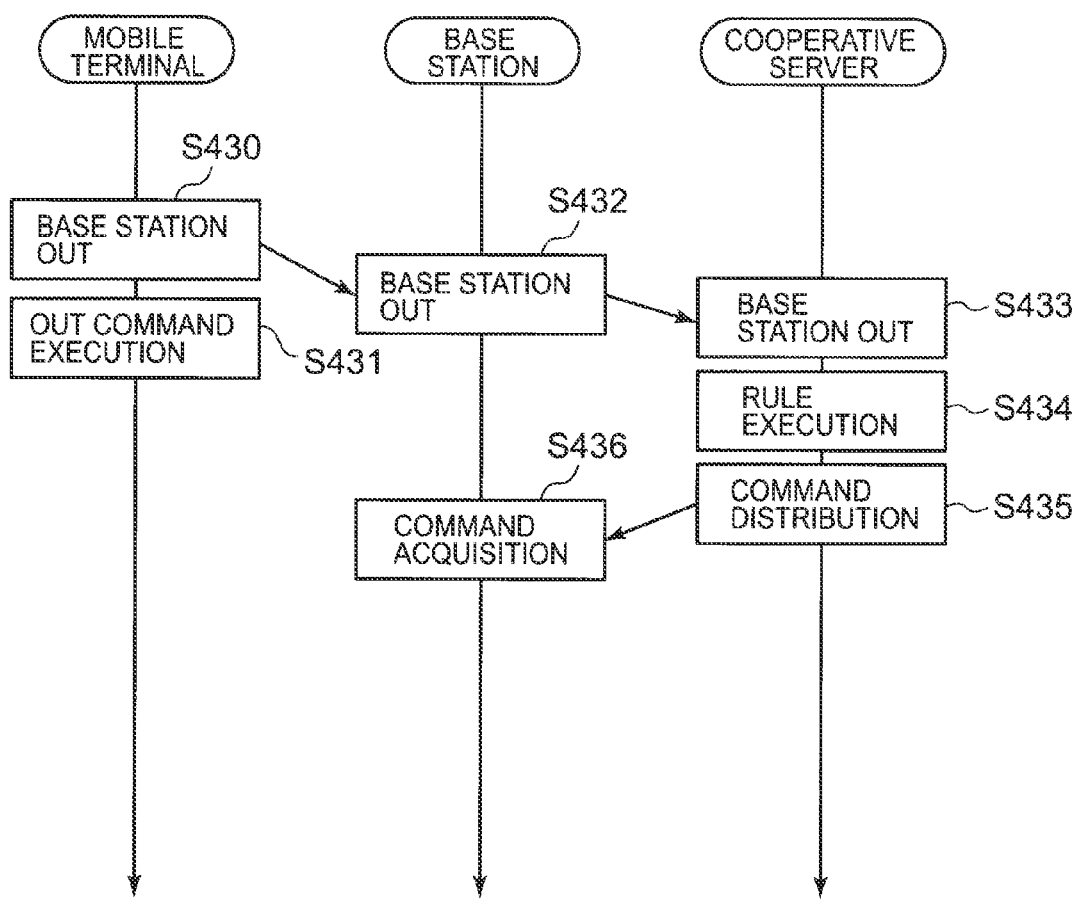
[FIG. 6] It depicts a sequence diagram illustrating operations of the cooperative server, the base station, and the mobile terminal when an OUT command is executed.

FIG. 6 is a sequence diagram illustrating operations of the cooperative server, the base station, and the mobile terminal when the OUT command is executed. An operation in the case that the OUT command relating to the base station 120A is executed will be described with reference to FIG. 6.

The base station information acquiring means 134 detects that the mobile terminal 130 exits the area covered by the base station 120A (Step S430). In response to the command from the base station information acquiring means 134, the mode changing means 133 executes the OUT command of the in-mobile-terminal mode changing command data 350 stored in the terminal mode changing command storage device 135 (Step S431). The OUT command is activated after the time designated by the time difference 333 of the corresponding mode changing command 330 elapses.

On the other hand, the terminal entrance and exit managing means 123 of the base station 120A detects that the mobile terminal 130 exits the area covered by the base station 120A (Step S432), and the terminal entrance and exit managing means 123 notifies the terminal position managing means 111 in the cooperative server 110 that the mobile terminal 130 exits the area covered by the base station 120A. In the cooperative server 110, the terminal position managing means 111 that receives the notification from the terminal entrance and exit managing means stores the residence history of the mobile terminal 130 in the rule and history DB 114, and updates the base station residence history 313 of the terminal information 310. That the mobile terminal 130 exits the area covered by the base station 120A is registered in the cooperative server 110 through the operation (Step S433). When the base station residence history 313 is updated, the rule checking means 112 is activated to check the rule. In the checking of the rule, the rule checking means 112 activates the script 322 of the rule information 320 to execute the rule (Step S434).

As a result of the execution of the rule in Step S434, the mode changing commands 330 are collected to generate the in-base-station mode changing command data 340. The base station mode changing command transmitting means 213 transmits the generated in-base-station mode changing command data 340 to the base station mode changing command receiving means 121 of the base station 120A (Step S435).

When receiving the in-base-station mode changing command data 340, the base station mode changing command receiving means 121 of the base station 120A stores the received in-base-station mode changing command data 340 in the mode changing command DB 124 (Step S436). Because the mobile terminal 130 does not enter the area covered by the base station 120A, the command is not transmitted to the mobile terminal 130, but the base station mode changing command receiving means 121 waits for the mobile terminal 130 to enter the area covered by the base station 120A.

Figure 7:
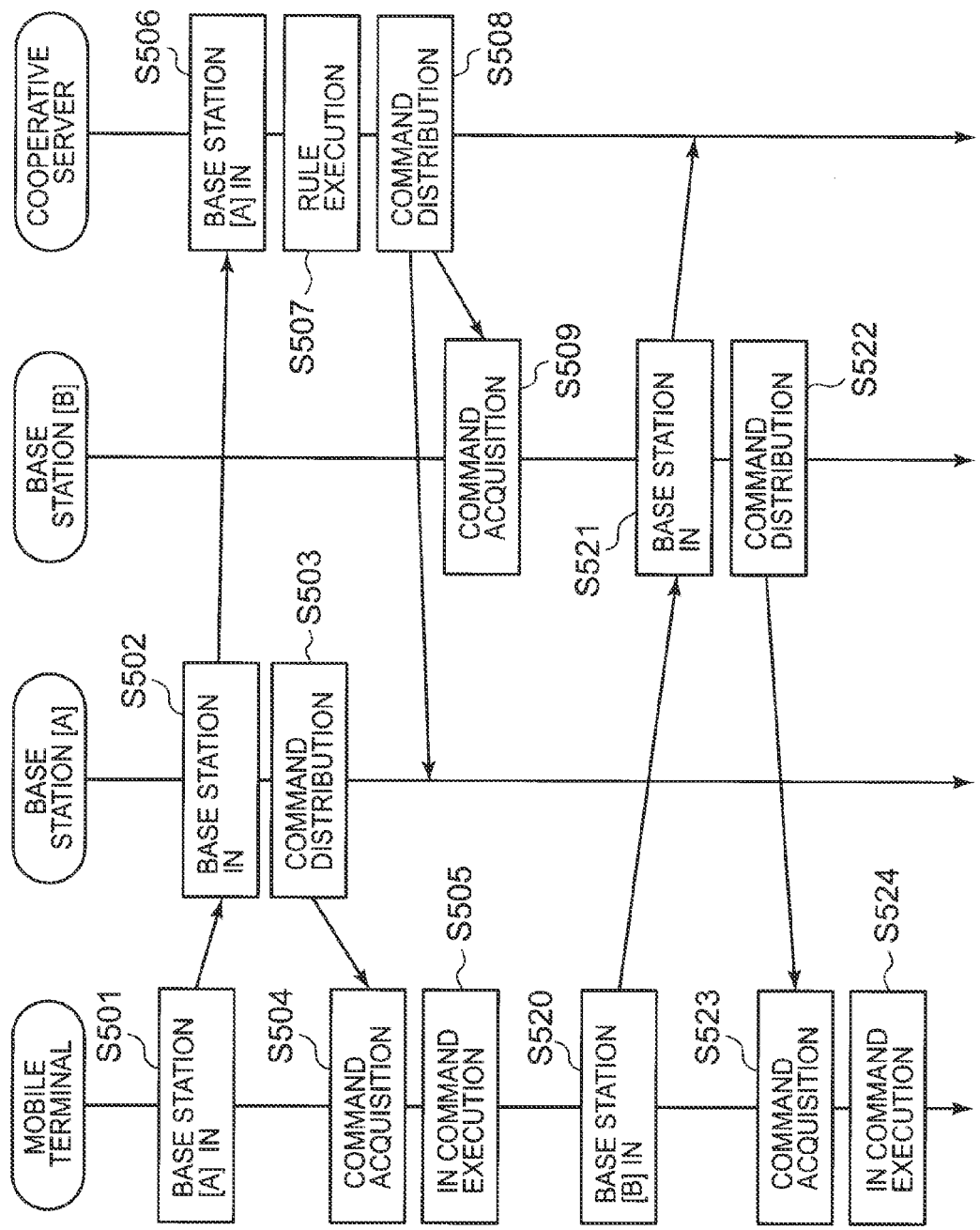
[FIG. 7] It depicts a sequence diagram illustrating operations of the cooperative server, the base stations, and the mobile terminal when a rule that plural base stations cooperate with each other is executed.

FIG. 7 is a sequence diagram illustrating operations of the cooperative server, the base stations, and the mobile terminal when the rule that the base stations cooperate with each other is executed. An operation in the case that the rule in which the base station 120A and the base station 120B cooperate with each other is executed will be described with reference to FIG. 7.

When the mobile terminal 130 enters the area covered by the base station 120A (Step S501), the terminal entrance and exit managing means 123 of the base station 120A detects that the mobile terminal 130 enters the area covered by the base station 120A (Step S502), and notifies the terminal position managing means 111 of the cooperative server 110 that the mobile terminal 130 enters the area covered by the base station 120A.

In Step S502, when the terminal entrance and exit managing means 123 of the base station 120A detects that the mobile terminal 130 enters the area covered by the base station 120A, the terminal mode changing command transmitting means 122 is activated with the detection as the trigger. The terminal mode changing command transmitting means 122 transmits the in-mobile-terminal mode changing command data 350 to the terminal mode changing command receiving means 131 of the mobile terminal 130 (Step S503).

When the terminal mode changing command receiving means 131 of the mobile terminal 130 receives the in-mobile-terminal mode changing command data 350 (Step S504), the mode changing means 133 executes the IN command to perform the mode change in association with the entrance of the mobile terminal 130 into the area covered by the base station 120A (Step S505).

On the other hand, in the cooperative server 110 that receives the notification in Step S502, the terminal position managing means 111 that receives the notification from the terminal entrance and exit managing means stores the residence history of the mobile terminal 130 in the rule and history DB 114, and updates the base station residence history 313 of the terminal information 310. That the mobile terminal 130 enters the area covered by the base station 120A is registered in the cooperative server 110 through the operation (Step S506). When the base station residence history 313 is updated, the rule checking means 112 is activated to check the rule. In the checking of the rule, the rule checking means 112 activates the script 322 of the rule information 320 to execute the rule (Step S507). It is assumed that the conditional expression in which the base station 120A and the base station 120B cooperate with each other is described in the script 322.

As a result of the execution of the rule in Step S507, the mode changing commands 330 are collected to generate the in-base-station mode changing command data 340. The base station mode changing command transmitting means 213 transmits the generated in-base-station mode changing command data 340 to the base station mode changing command receiving means 121 of the base stations 120A and 120B (Step S508).

The base station mode changing command receiving means 121 of the base stations 120A and 120B receives the in-base-station mode changing command data 340 (Step S509). At this point, when the mobile terminal 130 does not enter the area covered by the base station 120B yet, the base station mode changing command receiving means 121 of the base station 120B stores the received in-base-station mode changing command data 340 in the mode changing command DB 124.

When the mobile terminal 130 enters the area covered by the base station 120B (Step S520), the terminal entrance and exit managing means 123 of the base station 120B detects that the mobile terminal 130 enters the area covered by the base station 120B (Step S521), and notifies the terminal position managing means 111 of the cooperative server 110 that the mobile terminal 130 enters the area covered by the base station 120B.

In Step S521, when the terminal entrance and exit managing means 123 of the base station 120B detects that the mobile terminal 130 enters the area covered by the base station 120B, the terminal mode changing command transmitting means 122 of the base station 120B is activated with the detection as the trigger. The terminal mode changing command transmitting means 122 transmits the in-mobile-terminal mode changing command data 350 to the terminal mode changing command receiving means 131 of the mobile terminal 130 (Step S522).

When the terminal mode changing command receiving means 131 of the mobile terminal 130 receives the in-mobile-terminal mode changing command data 350 (Step S523), the mode changing means 133 executes the IN command to perform the mode change in association with the entrance of the mobile terminal 130 into the area covered by the base station 120B (Step S524). The rule in which the base station 120A and the base station 120B cooperate with each other is executed by the execution of the IN command in Steps S505 and S524.

The operation (for example, corresponding to the operations Steps S430 to S436 illustrated in FIG. 6) in the case that the mobile terminal 130 exits the area covered by the base station 120A is omitted in the flowchart illustrated in FIG. 7. The operation (for example, corresponding to the operations Steps S422 to S426 illustrated in FIG. 5) in the case that the command is distributed from each base station to the mobile terminal 130 to execute the IN command again after the cooperative server 110 distributed the command in Step S508 is also omitted.

In the cooperative server 110 of the above mobile communication system, the residence histories in the areas covered by the plural base stations are accumulated in each mobile terminal 130 according to the pieces of terminal entrance and exit management information received from the base stations 120A, 120B, and 120C, the rule information 320 is referred to, and the mode changing command 330 of the corresponding mobile terminal 130 is transmitted to the base stations 120A, 120B, and 120C when the patterns are matched. Each of the base stations 120A, 120B, and 120C transmits the mode changing command 330, which is issued in timing in which the mobile terminal 130 enters and exits the area covered by each base station, when the mobile terminal 130 enters the area covered by each base station. In the mobile terminal 130, the mode change in which the base stations 120A, 120B, and 120C cooperate with one another can be performed by changing the mode in response to the mode changing command 330, and the finer mode change can be implemented in association with the entrance and exit of the mobile terminal 130 into and from the areas covered by the base stations 120A, 120B, and 120C.

In the mobile terminal 130, after the mode change is performed (for example, corresponding to the operations in Steps S417 and S418 illustrated in FIG. 5) in response to the mode changing command 330 received from each base station, the command is distributed from the cooperative server 110 to the mobile terminal 130 through each base station, and the command is executed again (for example, corresponding to the operations in Steps S422 to S426 illustrated in FIG. 5), so that the mobile terminal 130 can acquire and execute the latest mode changing command.

First Example

Figure 9:
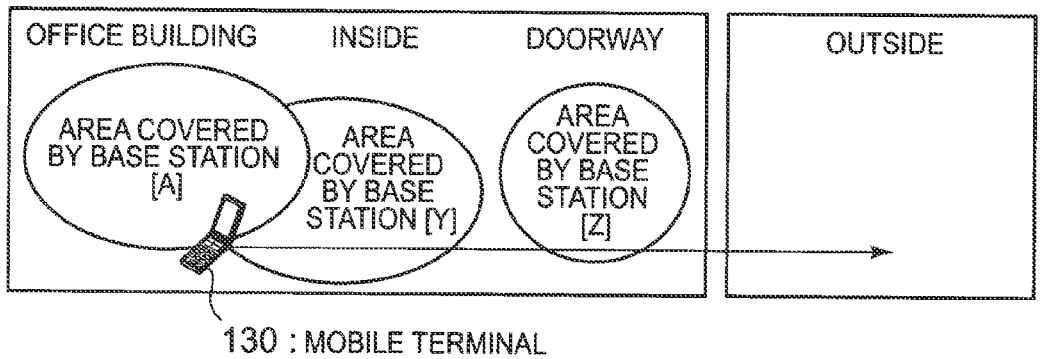
[FIG. 9] It depicts an explanatory view illustrating an example of the mobile communication system illustrated in FIG. 1.
Figure 9:
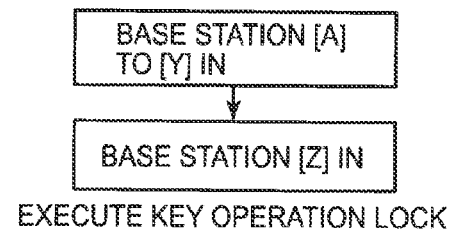
Figure 9:
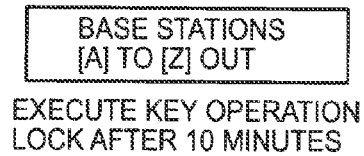

FIG. 9 is an explanatory view illustrating an example of the mobile communication system illustrated in FIG. 1. The example, in which the key operation lock of the mobile terminal is automatically validated when the mobile terminal exits an office building (in-company) in which the small-scale base stations are collectively disposed, will be described with reference to FIG. 9.

In the first example, the plural small-scale base stations are disposed in the office building. For example, plural base stations (A base station, and B base station to Y base station) are disposed on floors of the office building. A Z base station is disposed near a doorway of the office building. The A base station, the B base station to the Y base station, and the Z base station correspond to the plural base stations 120A, 120B, and 120C illustrated in FIG. 1 and are placed under the charge of the cooperative server 110.

In the first example, a rule 1 illustrated in FIG. 9 is set. The script is described in the rule 1 such that "the key operation lock is executed when the mobile terminal 130 moves to the area covered by the Z base station after staying in the area covered by any one of the A to Y base stations". That is, the script is described as "if (A base station IN or . . . or Y base station IN)<Z base station IN" then {immediately execute command to perform key operation lock ON}". The mobile terminal 130 can immediately perform the mode change to validate the key operation lock by the setting of the rule 1, when the mobile terminal 130 moves to the neighborhood of the doorway of the office building (enters the area covered by the Z base station) after staying in the company (staying in the areas covered by the A to Y base stations).

The key operation lock is not validated only by the setting of the rule 1 when the mobile terminal 130 exits the company through a doorway except the doorway located in the area covered by the Z base station. Therefore, a rule 2 illustrated in FIG. 9 may be set.

The script is described in the rule 2 such that "the key operation lock is executed ten minutes after the mobile terminal 130 exits the area covered by any one of the A to Z base stations". The mobile terminal 130 can validate the key operation lock not immediately but after 10 minutes by the setting of the rule 2, when the mobile terminal 130 exits the company through the doorway except the doorway located in the area covered by the Z base station. That is, the key operation lock can automatically be validated when the mobile terminal 130 exits the company.

Second Example

Figure 10:
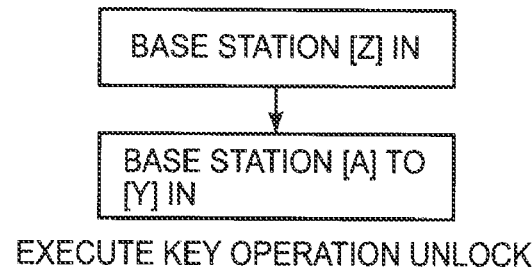
[FIG. 10] It depicts an explanatory view illustrating another example of the mobile communication system illustrated in FIG. 1.
Figure 10:
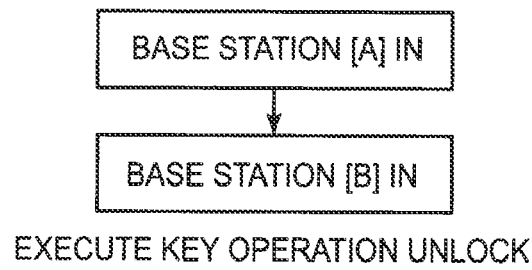

FIG. 10 is an explanatory view illustrating another example of the mobile communication system illustrated in FIG. 1. The example, in which the key operation lock of the mobile terminal is automatically released when the mobile terminal returns to the company from the outside, will be described with reference to FIG. 10.

In the second example, a rule 3 illustrated in FIG. 10 is set. The script is described in the rule 3 such that "the key operation lock is released when the mobile terminal 130 moves to the area covered by the Z base station while not staying in any area covered by the A to Y base stations". That is, the script is described as "if (Z base station IN<(A base station IN or . . . or Y base station IN)) then {immediately execute command to perform key operation lock ON}". The mobile terminal 130 can immediately perform the mode change to release the key operation lock by the setting of the rule 3, when the mobile terminal 130 moves to the neighborhood of the doorway of the office building (enters the area covered by the Z base station) from the outside of the company.

The key operation lock cannot be released only by the setting of the rule 3 when the mobile terminal 130 returns to the company through the doorway except the doorway located in the area covered by the Z base station. Therefore, a rule 4 illustrated in FIG. 10 may be set.

The script is described in the rule 4 such that "the key operation lock is released when the mobile terminal 130 stays in at least two of the areas covered by the A to Y base stations". It is difficult that the script of the rule 4 be directly expressed by the script in which the simple conditional expression such as an if-clause is used. However, for example, the script that extracts the continuous existence of the mobile terminal 130 in the area covered by at least two base stations (for example, A base station and B base station) can be expressed by the description that "the mobile terminal 130 enters the area covered by the B base station after entering the area covered by the A base station". The mobile terminal 130 can automatically release the key operation lock by the setting of the rule 4, when the mobile terminal 130 returns to the company from the outside through the doorway except the doorway located in the area covered by the Z base station.

FIG. 11 is a block diagram illustrating a main configuration of a mobile communication system according to the invention. As illustrated in FIG. 11, the mobile communication system includes a mobile terminal 1 (for example, corresponding to the mobile terminal 130 illustrated in FIG. 1), plural base stations 2 (for example, corresponding to the base stations 120A, 120B, and 120C illustrated in FIG. 1) each of which can conduct communication with the mobile terminal 1, and a cooperative server 3 (for example, corresponding to the cooperative server 110 illustrated in FIG. 1) which can conduct communication with the base stations 2. The cooperative server 3 includes: terminal position managing means 31 (for example, corresponding to the terminal position managing means 111 illustrated in FIG. 2) for acquiring positional information on the mobile terminal 1 from a detection result (for example, corresponding to the entrance and exit information of which the terminal entrance and exit managing means 123 illustrated in FIG. 2 notifies the terminal position managing means 111) of the mobile terminal 1 that enters and exits the area covered by the base station 2; history storing means 32 (for example, corresponding to the rule and history DB 114 illustrated in FIG. 2) for storing a residence history (for example, corresponding to the base station residence history 313 of the terminal information 310 illustrated in FIG. 3) of the mobile terminal 1 based on the positional information on the mobile terminal 1, which is acquired by the terminal position managing means 31, and a script (for example, corresponding to the script 322 of the rule information 320 illustrated in FIG. 3) indicating a rule of a mode setting designated in each mobile terminal 1; rule checking means 33 (for example, corresponding to the rule checking means 112 illustrated in FIG. 2) for activating the script to determine a mode changing command in each mobile terminal based on the residence history stored in the history storing means 32; and base station mode changing command transmitting means 34 (for example, corresponding to the base station mode changing command transmitting means 113 illustrated in FIG. 2) for transmitting the mode changing command (for example, corresponding to the in-base-station mode changing command data 340 illustrated in FIG. 4) determined by the rule checking means 33 to the base station. The base station 2 includes terminal entrance and exit managing means 21 (for example, corresponding to the terminal entrance and exit managing means 123 illustrated in FIG. 2) for detecting the entrance and exit of the mobile terminal 1 into and from the area covered by the base station 2 to notify the cooperative server of a detection result, base station mode changing command receiving means 22 (for example, corresponding to the base station mode changing command receiving means 121 illustrated in FIG. 2) for receiving the mode changing command from the base station mode changing command transmitting means 34 of the cooperative server 3, base station mode changing command storing means 23 (for example, corresponding to the mode changing command DB 124 illustrated in FIG. 2) for storing the mode changing command received by the base station mode changing command receiving means 22 therein, and terminal mode changing command transmitting means 24 (for example, corresponding to the terminal mode changing command transmitting means 122 illustrated in FIG. 2) for transmitting the mode changing command (for example, corresponding to the in-mobile-terminal mode changing command data 350 illustrated in FIG. 4) stored in the base station mode changing command storing means 23 to the mobile terminal 1 that exists in the area covered by the base station 2. The mobile terminal 1 includes terminal mode changing command receiving means 11 (for example, corresponding to the terminal mode changing command receiving means 131 illustrated in FIG. 2) for receiving the mode changing command from the terminal mode changing command transmitting means 24 of the base station 2 and mode changing means 12 (for example, corresponding to the mode changing means 133 illustrated in FIG. 2) for changing a mode setting of the mobile terminal 1 by executing the mode changing command that is received by the terminal mode changing command receiving means 11.

The following mobile communication systems (1) to (10) are also disclosed in the exemplary embodiments.

(1) The rule checking means determines the mode changing command by activating the script in which a sequence, in which the mobile terminal stays in the area covered by the base station, is set to a condition of the mode setting, and selects the mode changing command transmitted to each base station in each base station based on the determined mode changing command (for example, implemented using the script indicated by the description example of the script 322 in the case that the condition that the sequence in which the mobile terminal 130 passes through the plural areas of the base stations is considered).

(2) The mobile communication system, wherein the terminal mode changing command transmitting means immediately transmits the mode changing command stored in the base station mode changing command storing means of the base station to the mobile terminal when the terminal entrance and exit managing means detects that the mobile terminal enters the area covered by the base station, the rule checking means determines a latest mode changing command when the terminal entrance and exit managing means notifies the rule checking means that the mobile terminal enters the area covered by the base station, the base station mode changing command transmitting means transmits the latest mode changing command determined by the rule checking means to the base station mode changing command receiving means, and the terminal mode changing command transmitting means transmits the latest mode changing command received by the base station mode changing command receiving means to the mobile terminal again (for example, implemented by the operation in Steps S415 to S424 illustrated in FIG. 5).

(3) The mobile communication system, wherein the mode changing means starts the execution of the mode changing command while the execution of the mode changing command is delayed by a set time when a time difference is set to the mode changing command (for example, implemented by the operation in the case that the value except 0 is described in the time difference 333 of the mode changing command 330).

(4) The mobile communication system, wherein the mode changing command is an IN command that is executed when the mobile terminal enters the area covered by a predetermined base station or an OUT command that is executed when the mobile terminal exits the area covered by the predetermined base station.

(5) The mobile communication system, wherein the mobile terminal includes: command storing means (for example, corresponding to the terminal mode changing command storage device 135 illustrated in FIG. 2) for storing the OUT command therein; and base station information acquiring means (for example, corresponding to the base station information acquiring means 134 illustrated in FIG. 2) for detecting a change of the base station with which the mobile terminal conducts communication, and the mode changing means executes the OUT command to change the mode setting of the mobile terminal, when the base station information acquiring means detects that the mobile terminal does not conduct communication with the base station designated by the OUT command stored in the command storing means (for example, implemented by the operation in Step S430 and S431 illustrated in FIG. 6).

(6) The mobile communication system, wherein the mode changing command changes a setting of a mode to lock a key operation of the mobile terminal.

(7) The mobile communication system, wherein the mode changing command changes a setting of a silent mode of the mobile terminal.

(8) The mobile communication system, wherein the mode changing command changes a setting of a wireless LAN function of the mobile terminal.

(9) The mobile communication system, wherein the mode changing command changes a setting of a power state of the mobile terminal.

(10) The mobile communication system, wherein the base station includes: at least one base station in which a doorway of a certain service space is set to the area; and plural base stations in which an inside of the service space is set to the area, and the rule checking means determines the mode changing command, in which whether the mobile terminal enters or exits the service space is set to a condition to change the mode setting, based on the residence history in which the mobile terminal enters and exits the area covered by the base station (for example, implemented by the mobile communication systems of the first and second exemplary embodiments).

The following automatic mode-changing methods (11) and (12) are also disclosed in the embodiments.

(11) The automatic mode-changing method, wherein the cooperative server determines the mode changing command by activating the script in which a sequence, in which the mobile terminal stays in the area covered by the base station, is set to a condition of the mode setting, and selects the mode changing command transmitted to each base station in each base station based on the determined mode changing command.

(12) The automatic mode-changing method, wherein the base station immediately transmits the mode changing command stored in the base station to the mobile terminal when the mobile terminal detects that the mobile terminal enters the area covered by the base station, and the cooperative server that is notified of the detection result transmits the latest mode changing command to the mobile terminal again when receiving the latest mode changing command.

Although the embodiments and the examples of the invention are described above, the invention is not limited to the embodiments and the examples. It is understood by those skilled in the art that various changes and modifications can be made without departing from the scope of the invention.

This application is based on Japanese Patent Application No. 2009-154213 filed with Japan Patent Office on Jun. 29, 2009, the entire content of which is hereby incorporated by reference.

INDUSTRIAL APPLICABILITY

The invention can be applied to the mobile communication system in which, with respect to the mode settings such as the silent mode and the key operation lock of the mobile phone terminal, the mode can more finely be changed automatically by not an independent decision of the mobile terminal user but the system operation manager of the mobile communication system who manages the femto base station or the wireless LAN base station.

REFERENCE SIGNS LIST

1 Mobile terminal
2 Base station
3 Cooperative server
11 Terminal mode changing command receiving means
12 Mode changing means
21 Terminal entrance and exit managing means
22 Base station mode changing command receiving means
23 Base station mode changing command storing means
24 Terminal mode changing command transmitting means
31 Terminal position managing means
32 History storing means
33 Rule checking means
34 Base station mode changing command transmitting means
100 External base station
110 Cooperative server
111 Terminal position managing means
112 Rule checking means
113 Base station mode changing command transmitting means
114 Rule and history DB
120A,120B,120C Base station
121 Base station mode changing command receiving means
122 Terminal mode changing command transmitting means
123 Terminal entrance and exit managing means
124 Mode changing command DB
130 Mobile terminal
131 Terminal mode changing command receiving means
132 Autonomous mode changing managing means
133 Mode changing means
134 Base station information acquiring means
135 Terminal mode changing command storage device
310 Terminal information
311 Terminal ID
312 Rule ID group
313 Base station residence history
320 Rule information
321 Rule ID
322 Script
330 Mode changing command
331 Command ID
332, 611 Execution timing
333 Time difference
334, 612 Mode type
335, 613 Change mode
340 In-base-station mode changing command data
341 Terminal ID
342, 352 IN command group
343, 353 OUT command group
350 In-mobile-terminal mode changing command data
610 Command

The invention claimed is:

1. A mobile communication system comprising:
a mobile terminal;
a plurality of base stations each of which can conduct communication with the mobile terminal; and
a cooperative server that can conduct communication with the base station,
wherein the cooperative server includes:
a terminal position managing unit which acquires positional information on the mobile terminal from a detection result of the mobile terminal that enters and exits an area covered by the base station;
a history storing unit which stores a residence history of the mobile terminal based on the positional information on the mobile terminal, which is acquired by the terminal position managing unit, and a script indicating a rule of a mode setting designated in each mobile terminal;
a rule checking unit which activates the script to determine a mode changing command in each mobile terminal based on the residence history stored in the history storing unit; and a base station mode changing command transmitting unit which transmits the mode changing command determined by the rule checking unit to the base station, the base station includes:

a terminal entrance and exit managing unit which detects the entrance and exit of the mobile terminal into and from the area covered by the base station to notify the cooperative server of a detection result;

a base station mode changing command receiving unit which receives the mode changing command from the base station mode changing command transmitting unit of the cooperative server;

a base station mode changing command storing unit which stores the mode changing command received by the base station mode changing command receiving unit therein; and a terminal mode changing command transmitting unit which transmits the mode changing command stored in the base station mode changing command storing unit to the mobile terminal that exists in the area covered by the base station, and the mobile terminal includes:

a terminal mode changing command receiving unit which receives the mode changing command from the terminal mode changing command transmitting unit of the base station; and a mode changing unit which changes a mode setting of the mobile terminal by executing the mode changing command that is received by the terminal mode changing command receiving unit.

2. The mobile communication system according to claim 1, wherein the rule checking unit determines the mode changing command by activating the script in which a sequence, in which the mobile terminal stays in the area covered by the base station, is set to a condition of the mode setting, and selects the mode changing command transmitted to each base station in each base station based on the determined mode changing command.

3. The mobile communication system according to claim 1, wherein the terminal mode changing command transmitting unit immediately transmits the mode changing command stored in the base station mode changing command storing unit of the base station to the mobile terminal when the terminal entrance and exit managing unit detects that the mobile terminal enters the area covered by the base station, the rule checking unit determines a latest mode changing command when the terminal entrance and exit managing unit notifies the rule checking unit that the mobile terminal enters the area covered by the base station, the base station mode changing command transmitting unit transmits the latest mode changing command determined by the rule checking unit to the base station mode changing command receiving unit, and the terminal mode changing command transmitting unit transmits the latest mode changing command received by the base station mode changing command receiving unit to the mobile terminal again.

4. The mobile communication system according to claim 1, wherein the mode changing unit starts the execution of the mode changing command while the execution of the mode changing command is delayed by a set time when a time difference is set to the mode changing command.

5. The mobile communication system according to claim 1, wherein the mode changing command is an IN command that is executed when the mobile terminal enters the area covered by a predetermined base station or an OUT command that is executed when the mobile terminal exits the area covered by the predetermined base station.

6. The mobile communication system according to claim 5, wherein the mobile terminal includes:

a command storing unit which stores the OUT command therein; and a base station information acquiring unit which detects a change of the base station with which the mobile terminal conducts communication, and the mode changing unit executes the OUT command to change the mode setting of the mobile terminal, when the base station information acquiring unit detects that the mobile terminal does not conduct communication with the base station designated by the OUT command stored in the command storing unit.

7. The mobile communication system according to claim 1, wherein the mode changing command changes a setting of a mode to lock a key operation of the mobile terminal.

8. The mobile communication system according to claim 1, wherein the mode changing command changes a setting of a silent mode of the mobile terminal.

9. The mobile communication system according to claim 1, wherein the mode changing command changes a setting of a wireless LAN function of the mobile terminal.

10. The mobile communication system according to claim 1, wherein the mode changing command changes a setting of a power state of the mobile terminal.

11. The mobile communication system according to claim 1, wherein the base station includes: at least one base station in which a doorway of a certain service space is set to the area; and a plurality of base stations in which an inside of the service space is set to the area, and the rule checking unit determines the mode changing command, in which whether the mobile terminal enters or exits the service space is set to a condition to change the mode setting, based on the residence history in which the mobile terminal enters and exits the area covered by the base station.

12. A mobile communication system comprising:

a plurality of base stations each of which can conduct communication with a mobile terminal; and a cooperative server that can conduct communication with the base station, wherein the cooperative server includes:

a terminal position managing unit which acquires positional information on the mobile terminal from a detection result of the mobile terminal that enters and exits an area covered by the base station;

a history storing unit which stores a residence history of the mobile terminal based on the positional information on the mobile terminal, which is acquired by the terminal position managing unit, and a script indicating a rule of a mode setting designated in each mobile terminal;

a rule checking unit which activates the script to determine a mode changing command in each mobile terminal based on the residence history stored in the history storing unit; and a base station mode changing command transmitting unit which transmits the mode changing command determined by the rule checking unit to the base station, and the base station includes:

a terminal entrance and exit managing unit which detects the entrance and exit of the mobile terminal into and from the area covered by the base station to notify the cooperative server of a detection result;

a base station mode changing command receiving unit which receives the mode changing command from the base station mode changing command transmitting unit of the cooperative server;

a base station mode changing command storing unit which stores the mode changing command received by the base station mode changing command receiving unit therein; and a terminal mode changing command transmitting unit which transmits the mode changing command stored in the base station mode changing command storing unit to the mobile terminal that exists in the area covered by the base station.

13. The mobile communication system according to claim 12, wherein the rule checking unit determines the mode changing command by activating the script in which a sequence, in which the mobile terminal stays in the area covered by the base station, is set to a condition of the mode setting, and selects the mode changing command transmitted to each base station in each base station based on the determined mode changing command.

14. The mobile communication system according to claim 12, wherein the terminal mode changing command transmitting unit immediately transmits the mode changing command stored in the base station mode changing command storing unit of the base station to the mobile terminal when the terminal entrance and exit managing unit detects that the mobile terminal enters the area covered by the base station, the rule checking unit determines a latest mode changing command when the terminal entrance and exit managing unit notifies the rule checking unit that the mobile terminal enters the area covered by the base station, the base station mode changing command transmitting unit transmits the latest mode changing command determined by the rule checking unit to the base station mode changing command receiving unit, and the terminal mode changing command transmitting unit transmits the latest mode changing command received by the base station mode changing command receiving unit to the mobile terminal again.

15. An automatic mode-changing method for changing a mode setting of a mobile terminal in a mobile communication system that includes the mobile terminal, a plurality of base stations each of which can conduct communication with a mobile terminal, and a cooperative server that can conduct communication with the base station, wherein the base station detects the mobile terminal, which enters and exits an area covered by the base station, to notify the cooperative server of a detection result;

the cooperative server acquires positional information on the mobile terminal from the detection result of which the base station notifies the cooperative server;

the cooperative server stores a residence history of the mobile terminal based on the acquired positional information on the mobile terminal and a script indicating a rule of a mode setting designated in each mobile terminal in history storing unit;

the cooperative server activates the script to determine a mode changing command in each mobile terminal based on the residence history stored in the history storing unit;

the cooperative server transmits the determined mode changing command to the base station;

the base station receives the mode changing command from the cooperative server to store the mode changing command in base station mode changing command storing unit;

the base station transmits the mode changing command stored in the base station mode changing command storing unit to the mobile terminal that exists in the area covered by the base station;

the mobile terminal receives the mode changing command from the base station; and the mobile terminal executes the received mode changing command to change a mode setting of the mobile terminal.

16. The automatic mode-changing method according to claim 15, wherein the cooperative server determines the mode changing command by activating the script in which a sequence, in which the mobile terminal stays in the area covered by the base station, is set to a condition of the mode setting, and selects the mode changing command transmitted to each base station in each base station based on the determined mode changing command.

17. The automatic mode-changing method according to claim 15, wherein the base station immediately transmits the mode changing command stored in the base station to the mobile terminal when the mobile terminal detects that the mobile terminal enters the area covered by the base station, and the cooperative server that is notified of the detection result transmits the latest mode changing command to the mobile terminal again when receiving the latest mode changing command.

* * * * *